No. 820,633. PATENTED MAY 15, 1906.
L. H. & F. J. FINNEGAN.
CHOCOLATE CUTTER.
APPLICATION FILED JULY 5, 1904.
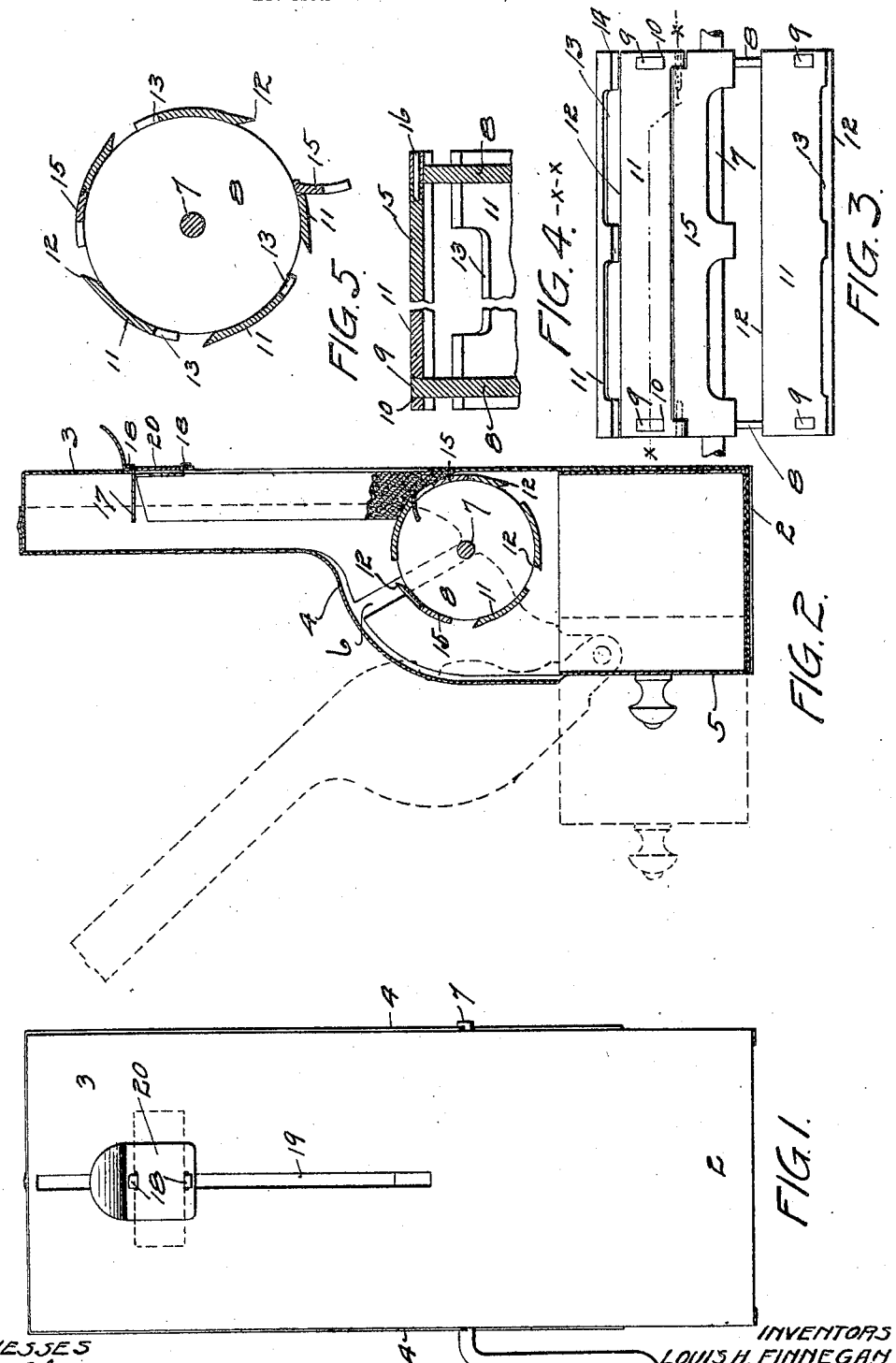
WITNESSES
INVENTORS
LOUIS H. FINNEGAN
FRANK J. FINNEGAN
BY
THEIR ATTORNEYS

UNITED STATES PATENT OFFICE.

LOUIS H. FINNEGAN AND FRANK J. FINNEGAN, OF MINNEAPOLIS, MINNESOTA.

CHOCOLATE-CUTTER.

No. 820,633. Specification of Letters Patent. Patented May 15, 1906.

Application filed July 5, 1904. Serial No. 215,206.

*To all whom it may concern:*

Be it known that we, LOUIS H. FINNEGAN and FRANK J. FINNEGAN, of Minneapolis, Hennepin county, Minnesota, have invented certain new and useful Improvements in Chocolate-Cutters, of which the following is a specification.

The object of my invention is to simplify and improve the chocolate-cutter shown and described in Letters Patent of the United States No. 713,270, issued November 11, 1902, to J. F. Wynkoop.

The invention consists generally in providing a force-feed device.

Further, the invention consists in providing pivoted throat-plates on the knife-cylinder, and, further, the invention consists in various constructions and combinations, all as hereinafter described, and particularly pointed out in the claims.

In the accompanying drawings, forming part of this specification, Figure 1 is a rear view of a chocolate-cutter embodying our invention. Fig. 2 is a vertical transverse section of the same. Fig. 3 is a plan view of the knife-cylinder. Fig. 4 is a section on the line $xx$ of Fig. 3. Fig. 5 is a transverse section of the knife-cylinder.

In the drawings, 2 represents a casing having a neck 3 at its upper end wherein the block or cake of chocolate is placed. A cover 4 is hinged at its lower end to the casing and adapted to be swung out to allow the insertion or removal of the cake of chocolate and the knife-cylinder. This cover is substantially the same as the one shown and described in the Letters Patent above referred to and needs no detailed description herein.

A drawer or box 5 is provided in the lower part of the casing to receive the chocolate, and slots 6 are provided in the walls of the casing to receive a shaft 7, whereon the knife-cylinder is mounted. This cylinder consists of heads 8, secured on the shaft and having lugs 9 at intervals, that are inserted into slots 10 in the ends of the knife-blades 11 and headed therein, holding the knives firmly in place in the cylinder. The knives are provided with cutting edges 12, that are adapted to engage the lower end of the cake of chocolate and slice or shave the same. We prefer to provide openings 13 between the cutting edge of one knife and the rear edge of the preceding knife, and these openings are preferably bridged by extensions 14, which prevent the cake of chocolate from becoming wedged in the cylinder, but allow the cut or shaved portions thereof to fall through.

At intervals preferably on opposite sides of the cylinder we provide throat-plates 15, supported on pivot-pins 16 and adapted to drop down to a vertical position, as indicated in Fig. 5, and allow the free discharge of any of the chocolate that may have accumulated within the cylinder. These throat-plates will drop to this position only when on the under side of the cylinder and will swing back within the periphery of the cylinder when it is revolved to bring them to the upper side thereof.

We find it desirable in a device of this kind to provide some means for feeding the chocolate down to the knives. We therefore provide an angle-plate 17, arranged to overhang the upper end of the cake of chocolate and engage the same and provided with lugs 18, that extend through a vertical slot 19 in the back of the casing and are secured to a clip 20. The operator can by pressing on this clip force the cake of chocolate down upon the knife-cylinder with sufficient pressure to cut the chocolate as fast as desired.

We claim as our invention—

1. In a chocolate-cutter, the combination with a casing having an upright contracted neck provided with a vertical centrally-arranged slot, of an angle-plate 17 extending transversely with respect to said slot and having a flange extending partially across said neck toward the front thereof and adapted to overhang the upper end of a cake of chocolate therein, and the other flange fitting against the rear wall of said neck on the inside and slidable thereon, a clip 20 fitting the rear wall of said neck on the outside and connected to the last-named flange through said slot and slidable therewith and having an outwardly-turned finger-piece, and a revoluble cutter arranged below said neck, substantially as described.

2. In a chocolate-cutter, a knife-cylinder comprising a shaft, heads mounted thereon, knives secured at their ends at intervals to the peripheries of said heads and having a longitudinal cutting edge on one side, a throat-plate pivoted at the rear edge of one of said knives adapted to swing down when on the drum side of said cylinder, the rest of said knives having each a series of extensions on its rear side partially bridging the space between the back edge of one knife and the corresponding edge of the contiguous one to prevent the cake of chocolate from becoming wedged in the cylinder, but allowing the shaved portions thereof to fall through.

In witness whereof we have hereunto set our hands this 29th day of June, 1904.

LOUIS H. FINNEGAN.
FRANK J. FINNEGAN.

In presence of—
RICHARD PAUL,
M. HAGERTY.